(12) United States Patent
Asada et al.

(10) Patent No.: US 10,351,370 B2
(45) Date of Patent: Jul. 16, 2019

(54) SHEET-SUPPLY TRAY

(71) Applicant: Brother Kogyo Kabushiki Kaisha, Nagoya-shi, Aichi-ken (JP)

(72) Inventors: Tetsuo Asada, Kuwana (JP); Yukio Shiohara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/455,851

(22) Filed: Mar. 10, 2017

(65) Prior Publication Data

US 2017/0225915 A1  Aug. 10, 2017

Related U.S. Application Data

(63) Continuation of application No. 14/826,842, filed on Aug. 14, 2015, now Pat. No. 9,624,052, which is a (Continued)

(30) Foreign Application Priority Data

Feb. 23, 2006 (JP) .................. 2006-046966

(51) Int. Cl.
*B41J 13/10* (2006.01)
*B41J 11/58* (2006.01)
(Continued)

(52) U.S. Cl.
CPC .............. *B65H 1/26* (2013.01); *B41J 11/006* (2013.01); *B41J 11/0025* (2013.01);
(Continued)

(58) Field of Classification Search
CPC . B65H 1/26; B65H 1/28; B65H 1/266; B65H 2801/06; B65H 3/66; B65H 3/68;
(Continued)

(56) References Cited

U.S. PATENT DOCUMENTS 4,449,705 A    5/1984  Shibuya et al.
5,120,040 A    6/1992  Worley
(Continued)

FOREIGN PATENT DOCUMENTS

JP    S61-188337 A    8/1986
JP    S61-277525 A    12/1986
(Continued)

OTHER PUBLICATIONS

Japan Patent Office, Notice of Reason(s) of Rejection for Japanese Patent Application No. 2006-046966 (counterpart to U.S. Pat. No. 7,997,818 B2), drafted Oct. 28, 2008.

*Primary Examiner* — Jill E Culler
*Assistant Examiner* — Marissa Ferguson-Samreth
(74) *Attorney, Agent, or Firm* — Baker Botts L.L.P.

(57) ABSTRACT

A sheet-supply tray device for use with an image recording apparatus, includes a lower sheet-supply tray and an upper sheet-supply tray. The upper sheet-supply tray includes a main body, a leading-end stopper, a trailing-end stopper and a side-end stopper. The main body includes a support surface that supports a recording sheet. The leading-end stopper is fixed on the main body and stops a leading end of the recording sheet. The trailing-end stopper includes a trailing-end contact surface having a trailing-end protrusion extending over an upper surface of a trailing-end portion of the recording sheet toward the leading-end stopper. The trailing-end contact surface contacts a trailing end of the recording sheet. The side-end stopper includes a side-end contact surface that contacts a side end of the recording sheet. The side-end contact surface has at least one side-end protrusion extending over an upper surface of a side-end portion of the recording sheet.

6 Claims, 12 Drawing Sheets

Related U.S. Application Data continuation of application No. 14/222,358, filed on Mar. 21, 2014, now Pat. No. 9,156,636, which is a continuation of application No. 13/185,214, filed on Jul. 18, 2011, now Pat. No. 8,714,852, which is a continuation of application No. 11/678,136, filed on Feb. 23, 2007, now Pat. No. 7,997,818.

(51) Int. Cl.

| | | |
|---|---|---|
| *B65H 1/28* | (2006.01) | |
| *B65H 1/26* | (2006.01) | |
| *H04N 1/00* | (2006.01) | |
| *B65H 1/04* | (2006.01) | |
| *B65H 9/04* | (2006.01) | |
| *B41J 11/00* | (2006.01) | |
| *B41J 11/48* | (2006.01) | |

(52) U.S. Cl.
CPC .............. *B41J 11/485* (2013.01); *B41J 11/58* (2013.01); *B41J 13/103* (2013.01); *B65H 1/04* (2013.01); *B65H 1/266* (2013.01); *B65H 1/28* (2013.01); *B65H 9/04* (2013.01); *H04N 1/0066* (2013.01); *H04N 1/00615* (2013.01); *B65H 2405/114* (2013.01); *B65H 2405/1142* (2013.01); *B65H 2801/06* (2013.01)

(58) Field of Classification Search
CPC ...... B65H 5/36; B65H 5/38; B65H 2405/114; B65H 2405/1142; B65H 2405/1144; B65H 2405/11425; B65H 1/04; B65H 9/04; B41J 13/10; B41J 13/12; B41J 13/14; B41J 13/16; B41J 13/0054; B41J 13/103; B41J 11/0025; B41J 11/58; H04N 1/0066; H04N 1/00615

See application file for complete search history.

(56) References Cited

U.S. PATENT DOCUMENTS

| | | | |
|---|---|---|---|
| 5,287,164 | A | 2/1994 | Watanabe |
| 5,737,682 | A | 4/1998 | Yamagishi |
| 5,927,707 | A | 7/1999 | Miura |
| 6,689,443 | B2 | 2/2004 | Kobayashi et al. |
| 6,776,405 | B2 | 8/2004 | Eskey |
| 7,681,875 | B2 | 3/2010 | Asada et al. |
| 7,694,950 | B2 | 4/2010 | Shiohara et al. |
| 7,694,951 | B2 | 4/2010 | Shiohara |
| 7,909,524 | B2 | 3/2011 | Connors et al. |
| 2004/0070138 | A1* | 4/2004 | Ishikuro ............... B65H 1/04 271/171 |
| 2004/0169327 | A1 | 9/2004 | Swayze et al. |
| 2004/0188923 | A1 | 9/2004 | Asada |
| 2004/0207142 | A1 | 10/2004 | Sasa et al. |
| 2005/0195242 | A1 | 9/2005 | Samoto et al. |

FOREIGN PATENT DOCUMENTS

| | | |
|---|---|---|
| JP | H05-294471 A | 11/1993 |
| JP | H06-087344 U | 12/1994 |
| JP | H07-053066 A | 2/1995 |
| JP | H11-059925 A | 3/1999 |
| JP | 2001-199560 A | 7/2001 |
| JP | 2002-234620 A | 8/2002 |
| JP | 2003-081449 A | 3/2003 |
| JP | 2003-176043 A | 6/2003 |
| JP | 2003-341854 A | 12/2003 |
| JP | 2005-075613 A | 3/2005 |
| JP | 2005-246907 A | 9/2005 |

* cited by examiner

SHEET-SUPPLY TRAY

The present application is a continuation of U.S. patent application Ser. No. 14/826,842 filed on Aug. 14, 2015, which is a continuation of U.S. patent application Ser. No. 14/222,358 filed on Mar. 21, 2014, which issued as U.S. Pat. No. 9,156,636 B2 on Oct. 13, 2015, which is a continuation of U.S. patent application Ser. No. 13/185,214 filed on Jul. 18, 2011, which issued as U.S. Pat. No. 8,714,852 B2 on May 6, 2014, which is a continuation U.S. patent application Ser. No. 11/678,136 filed on Feb. 23, 2007, which issued as U.S. Pat. No. 7,997,818 B2 on Aug. 16, 2011, and which claims the benefit of Japanese Patent Application No. 2006-046966 filed on Feb. 23, 2006, the disclosures of which are incorporated herein by reference in their entirety.

BACKGROUND OF THE INVENTION

Field of the Invention

The present invention relates to an image recording apparatus that records an image on a recording sheet, and in particular to a construction of a sheet-supply tray device that is employed by the image recording apparatus and that accommodates a plurality of recording sheets.

Discussion of Related Art

FIG. 12 shows an internal construction of a conventional ink-jet-type image recording apparatus disclosed by, e.g., Japanese Patent Application Publication No. 2005-246907.

In a lower portion of the ink-jet image recording apparatus, there is provided a sheet-supply tray 201 that accommodates a plurality of recording sheets. A sheet-supply roller 202 as a sheet mover is provided above the sheet-supply tray 201. Rotation of the sheet-supply roller 202 results in supplying, from the sheet-supply tray 201, the recording sheets, one by one, in a sheet-supply direction. Each recording sheet is conveyed along a sheet-convey path 203 represented by a two-dot-chain line. An ink-jet recording head 204 is provided midway in the sheet-convey path 203, and a platen 205 is opposed to the ink-jet recording head 204. A drive roller 206 and a presser roller 207 are provided on an upstream side of the ink-jet recording head 204, and cooperate with each other to nip each recording sheet and convey the same to the recording head 204. While the ink-jet recording head 204 is moved in a scanning direction perpendicular to the drawing sheet of FIG. 12, the recording head 204 eject droplets of ink toward the recording sheet being temporarily positioned on the platen 205, so as to record an image on the recording sheet. A sheet-discharge roller 208 and a presser roller 209 are provided on a downstream side of the ink-jet recording head 204, and cooperate with each other to nip the recording sheet on which the image has been recorded and discharge the same to a sheet-discharge tray 210.

Meanwhile, the ink-jet recording head 204 may record, e.g., a document on an A4-Size ordinary sheet or record, e.g., a picture on an L-Size glossy sheet. That is, the ink-jet recording apparatus may deal with recording sheets of different sorts (e.g., different materials or different sizes), depending upon images to be recorded. If, when a first image is recorded on a recording sheet of a first sort and subsequently a second image is recorded on a recording sheet of a different, second sort, a user needs to replace all the recording sheets of the first sort, remaining in the sheet-supply tray 201, with the recording sheets of the second sort, it is very cumbersome for the user.

Although a single sheet-supply tray can simultaneously accommodate recording sheets of different sorts, it is required that the recording sheets of one sort do not interfere with replenishing of the recording sheets of the other sort, and it is also required that when the recording sheets of the other sort is replenished, the recording sheets of the one sort be prevented from being irreversibly folded back, or dropping out of the sheet-supply tray.

SUMMARY OF THE INVENTION

In the above-identified background, the present invention has been developed. It is therefore an object of the present invention to solve at least one of the above-identified problems. It is another object of the present invention to provide an image recording apparatus that can accommodate a plurality of sorts of recording sheets and that can permit a user to replenish, without damaging recording sheets of a first sort, recording sheets of a second sort.

According to the present invention, there is provided an image recording apparatus, comprising a sheet-supply tray device which accommodates and holds a plurality of recording sheets and which supplies the recording sheets, one by one, in a sheet-supply direction; and an image recording device which records an image on each of the recording sheets supplied from the sheet-supply tray device. The sheet-supply tray device includes a first tray which accommodates and holds at least one first sheet of the plurality of recording sheets; a second tray which accommodates and holds at least one second sheet of the plurality of recording sheets, and which selectively takes a stacked posture thereof in which the second tray is stacked on the first tray, and an opening posture thereof in which at least a portion of the second tray opens at least a portion of the first tray; and a supporting device which supports at least the portion of the second tray while permitting the second tray to selectively take the stacked posture thereof and the opening posture thereof such that the at least one second sheet held by the second tray is not plastically deformed.

In the present image recording apparatus, the sheet-supply tray device includes the first and second trays and accordingly can simultaneously accommodate at least two sorts of recording sheets. Thus, the image recording apparatus can record, e.g., a document on an A4-Size ordinary sheet and also record, e.g., a picture on an L-Size glossy sheet, while a user need not replace the A4-Size ordinary sheets with the L-Size glossy sheets or vice versa. When the user replenishes the first tray with a first sort of recording sheets, the posture of the second tray is changed, relative to the first tray, from its stacked posture to its opening posture. Thus, the first tray is opened and accordingly the user can easily replenish the first tray with the first sort of recording sheets. In addition, when the first tray is replenished with the first sort of recording sheets, i.e., when the second tray is changed to its opening posture, a second sort of recording sheets accommodated by the second tray can be prevented from being wrinkled, folded back, plastically deformed, or dropping out of the second tray. Thus, the replenishing of the first tray with the first sort of recording sheets can be easily carried out by the user.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

Hereinafter, there will be described preferred embodiments of the present invention by reference to the drawings.

Figure 1:
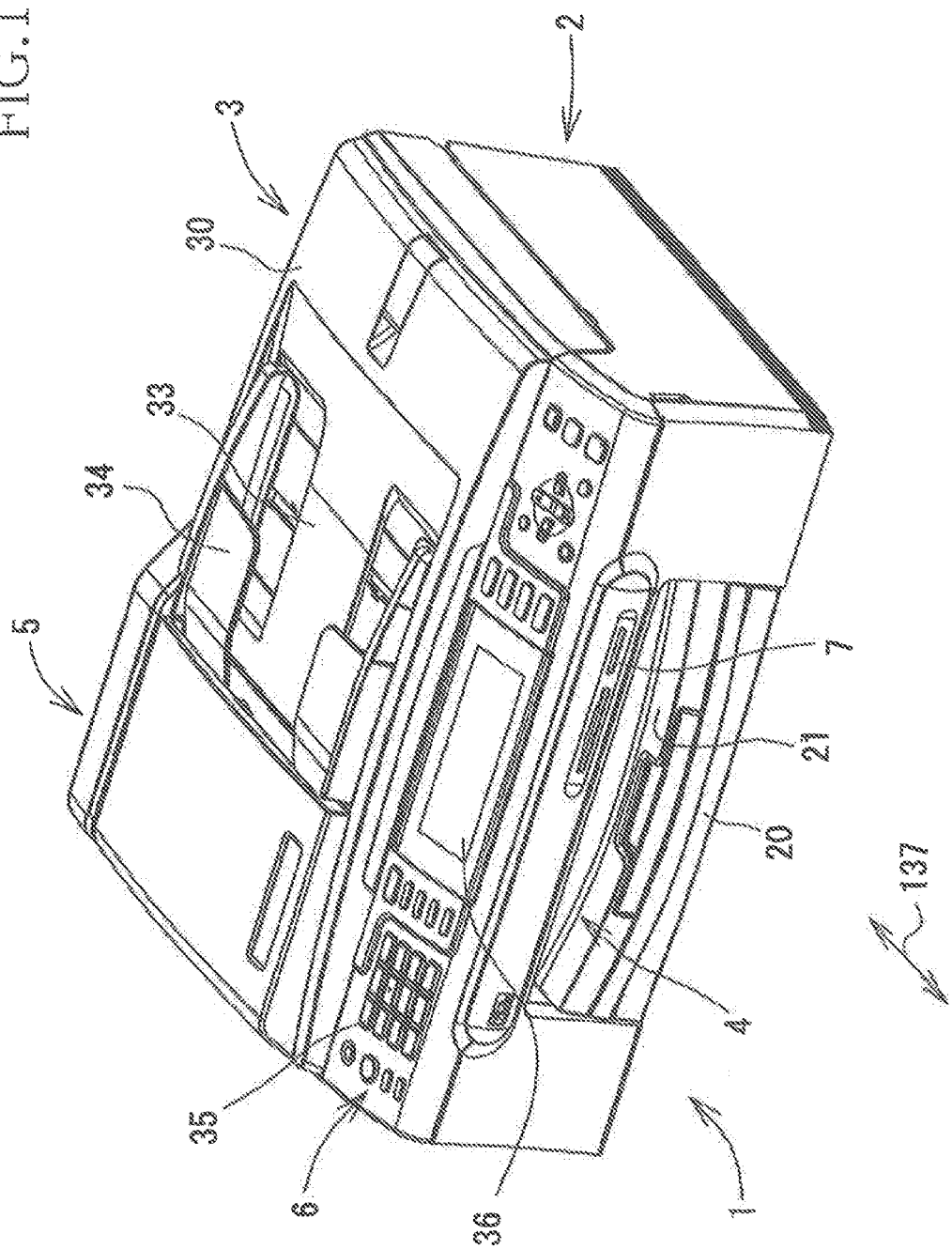
FIG. 1 is a perspective view showing an external construction of a multi-function device (MFD) to which the present invention is applied.
Figure 2:
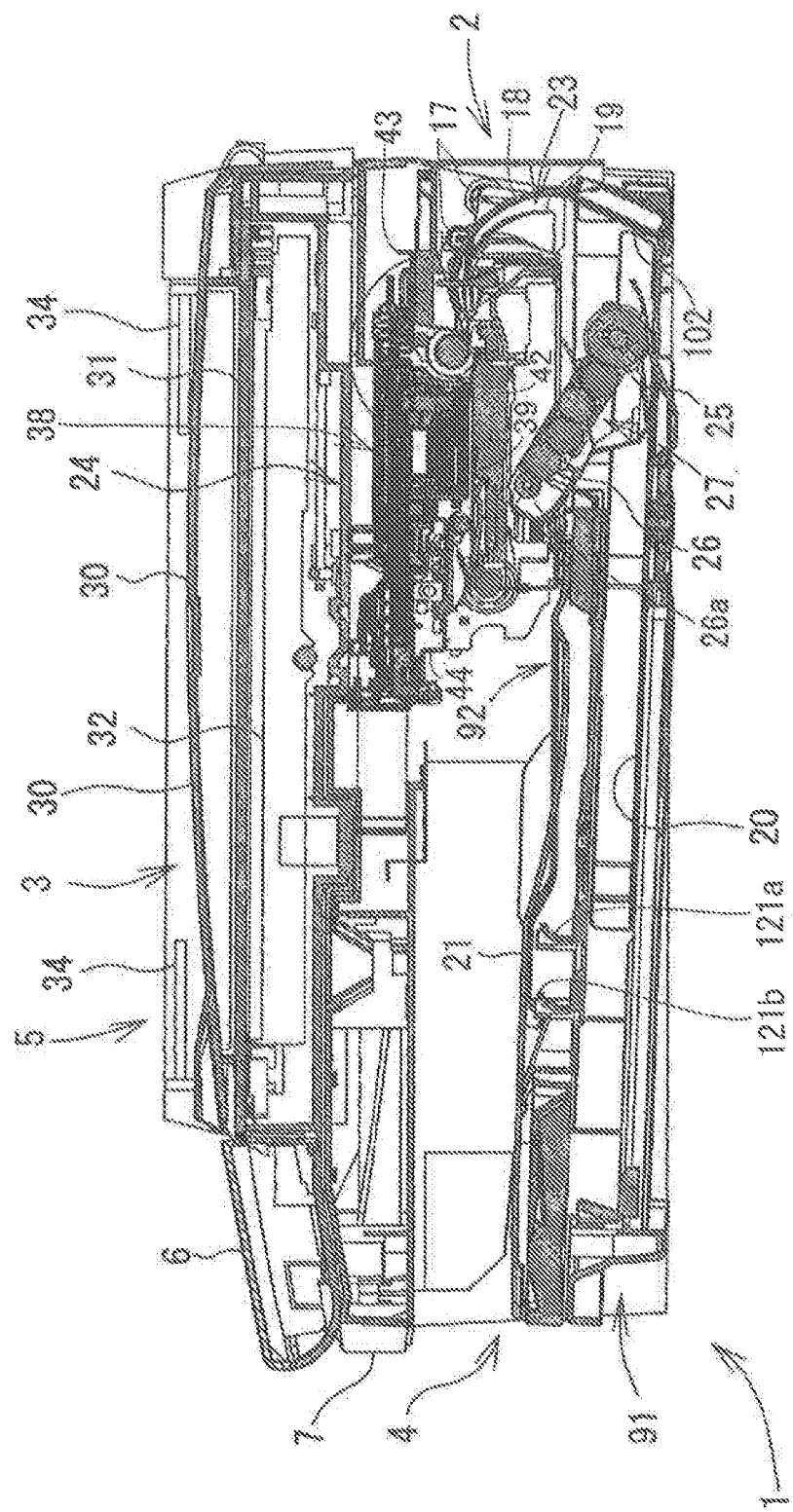
FIG. 2 is a cross-sectional view showing an internal construction of the MFD.

FIG. 1 shows an external appearance of a "multi-function device (MFD)" 1; and FIG. 2 shows an internal construction of the MFD 1.

The MFD 1 has a printer function, a scanner function, a copier function, and a facsimile-machine function, and includes a printer portion 2 provided in a lower portion thereof, and a scanner portion 3 provided in an upper portion thereof that is integral with the lower portion. In the MFD 1, the printer portion 2 corresponds to an image recording apparatus to which the present invention is applied, and accordingly the functions other than the printer function may be omitted. That is, the principle of the present invention is applicable to not only the MFD 1 but also a single-function printer that has only the printer function and does not have the scanner, copier, or facsimile-machine function.

When the MFD 1 functions as the printer, the MFD1 may be connected to an external computer, not shown, so that the printer portion 2 may record, based on image data or document data supplied from the computer, an image or a document on a recording sheet such as a paper sheet. In addition, the MFD 1 may be connected to an external device such as a digital camera, so that the printer portion 2 may record, based on image data supplied from the digital camera, an image on a recording sheet. Moreover, the MFD 1 may include a recording-medium receiving portion that can receive each of various sorts of recording media, such as a memory card, so that the printer portion 2 may record, based on image data stored by the each recording medium, an image on a recording sheet.

When the MFD 1 functions as the scanner, the scanner portion 3 reads an original image and transmits image data representing the read image, to the computer. Alternatively, the image data may be recorded on any of various sorts of recording media, such as a memory card. When the MFD 1 functions as the copier, the scanner portion 3 reads an original image and the printer portion 2 records, based on image data representing the read image, an image on a recording sheet. When the MFD 1 functions as the facsimile machine, the scanner portion 3 reads an original image and transmits, via a telephone line, image data representing the read image, to a remote facsimile machine. In addition, based on facsimile data received by the MFD 1, the printer portion 2 may record an image on a recording sheet.

As shown in FIG. 1, a length and a width of the MFD 1 are greater than a height thereof. Thus, the MFD 1 has a flat appearance with a generally rectangular parallelepiped shape. In the lower portion of the MFD 1, the printer portion 2 is provided. The printer portion 2 has a front opening 4 formed in a front surface of the MFD 1, and additionally has a sheet-supply tray device 20 and a sheet-discharge tray 21 both of which are exposed through the front opening 4. The sheet-supply tray device 20 can accommodate a plurality of sorts of recording sheets, e.g., sheets of different sizes not larger than A4 Size, such as A4 Size, B5 Size, or Postcard Size. As shown in FIG. 1, the sheet-supply tray device 20 includes a slideable member 20a that is extensible frontward to increase an area of a bottom surface (i.e., a sheet-support surface) of the tray device 20, so that the tray device 20 can accommodate Legal-Size recording sheets. The recording sheets stored by the sheet-supply tray device 20 are supplied, one by one, to an image recording unit 24 (i.e., an image recording device) of the printer portion 2, so that a desired image may be recorded on each recording sheet and then the each recording sheet is discharged onto the sheet-discharge tray 21.

The scanner portion 3 is provided in the upper portion of the MFD 1. The scanner portion 3 is a so-called "flat-bed" scanner. As shown in FIGS. 1 and 2, the scanner portion 3 includes a glass plate 31 on which an original sheet having an original image is placed; a pivotable cover member 30 that can be freely opened and freely closed to cover the original sheet placed on an upper surface of the glass plate 31; and an image sensor 32 that is provided below a lower surface of the glass plate 31 and reads the original image from the original sheet placed on the glass plate 31. The cover member 30 also functions as a top plate of the MFD 1. The image sensor 32 can be reciprocated in a direction perpendicular to the drawing sheet of FIG. 2.

The cover member 30 includes an original-sheet tray 33; a sheet-discharge tray 34; and an ADF (automatic document feeder) 5 that continuously feeds original sheets from the original-sheet tray 33 to the sheet-discharge tray 34 along a sheet-feed path, not shown. When the ADF 5 feeds each original sheet, the original sheet is temporarily placed on the glass plate 31, so that the image sensor 32, provided below the glass plate 31, reads an original image of the original sheet.

An operation panel 6 is provided in a front end portion of a top portion of the MFD 1. The operation panel 6 is for operating the printer portion 2 and the scanner portion 3. The operation panel 6 includes various operation keys 35 and a liquid crystal display (LCD) 36 that are usable by a user to input various commands to operate the MFD 1. In the case where the MFD 1 is connected to an external computer such as a personal computer (PC), the MFD 1 can be operated according to commands supplied from the external computer via a printer driver or a scanner driver.

The MFD 1 has, in the front surface thereof, a slot portion 7 into which various sorts of small-size memory cards can be inserted. When the operation panel 6 is operated by the user in an appropriate manner, the MFD 1 reads image data stored by the memory card inserted in the slot portion 7, and the LCD 36 of the operation panel 6 displays, based on the thus read image data, information related to the image data. Thus, the user can select, by operating the various keys 35 of the operation panel 6, one or more desired images from the image data, so that the printer portion 2 may record or print the image(s) on the recording sheet(s).

The present invention relates to the construction of the sheet-supply tray device 20 of the MFD 1. The sheet-supply tray device 20 has the following features: First, the tray device 20 has a double-tray arrangement, i.e., includes an upper tray and a lower tray, described later. Second, the tray device 20 is constructed as a unit wherein a portion of the tray device 20 also functions as the sheet-discharge tray 21. Since the sheet-supply tray device 20 has the double-tray arrangement, the tray device 20 can simultaneously accommodate different sorts of recording sheets. In addition, the user can replenish one of the upper and lower trays with a first sort of recording sheets, without damaging a second sort of recording sheets accommodated and held by the other tray.

Hereinafter, the internal construction of the MFD 1, in particular, the construction of the printer portion 2 will be described by reference to the drawings. As shown in FIG. 2, the sheet-supply tray device 20 is provided in the bottom portion of the MFD 1. The tray device 20 is insertable into, and removable from, a housing of the MFD 1 via the front opening 4, in rightward and leftward directions in FIG. 2. In the state in which the sheet-supply tray device 20 is inserted in the housing, the recording sheets accommodated by the tray device 20 can be supplied, one by one, toward the image recording unit 24 along the sheet-convey path 23. Meanwhile, in the state in which the sheet-supply tray device 20 is removed from the housing, the tray device 20 can be replenished with new recording sheets. The sheet-supply tray device 20 has an inclined sheet-separate plate 102 that is provided in a downstream-side end portion thereof with respect to a sheet-supply direction in which each recording sheet is supplied from the tray device 20. The sheet-separate plate 102 is inclined toward a rear surface of the MFD 1. The inclined sheet-separate plate 102 is for separating each of the recording sheets stacked in the sheet-supply tray device 20, from the other recording sheets, and guiding a movement of the separated recording sheet in an upward direction toward the sheet-convey path 23. As shown in FIG. 2, the sheet-convey path 23 first extends upward from the sheet-separate plate 102, and then curves toward the front surface of the MFD 1. That is, the sheet-convey path 23 extends from the rear portion of the MFD 1 toward the front portion thereof via the image recording unit 24 and the sheet-discharge tray 21. Thus, the sheet-convey path 23 includes a U-turn portion through which the direction of conveying of each recording sheet is reversed from the rearward direction to the frontward direction before the recording sheet is supplied to the image recording unit 24. After the image recording unit 24 records the image on the recording sheet, the each sheet is discharged onto the sheet-discharge tray 21.

The sheet-supply tray device 20 has a generally rectangular shape, and includes a first tray 91 and a second tray 92 that is stacked on the first tray 91. As will be described later, the second tray 92 can be raised from, and laid on, the first tray 91. More specifically described, the second tray 92 can change its posture between its stacked posture (FIGS. 3 and 4) in which the second tray 92 is stacked on the first tray 91, and its opening posture (FIGS. 7 through 9) in which the second tray 92 opens the first tray 91. In the present embodiment, the first tray 91 can accommodate a plurality of stacked ordinary paper sheets that are not larger than A4-Size sheets (i.e., a first sort of recording sheets); and the second tray 92 can accommodate a plurality of stacked special paper sheets such as L-Size glossy sheets or postcards (i.e., a second sort of recording sheets). Thus, the sheet-supply tray device 20 that simultaneously accommodate and hold the two sorts of stacked recording sheets can be inserted into, and removed from, the printer portion 2. However, according to the principle of the present invention, the first and second sorts of recording sheets that can be accommodated by the sheet-supply tray device 20 are not limited to the above-described kinds and sizes. For example, the first tray 91 may accommodate the glossy sheets, and the second tray 92 may accommodate the ordinary sheets. In addition, each of the first and second trays 91, 92 may accommodate other sorts of recording sheets or media than the paper sheets.

Figure 7:
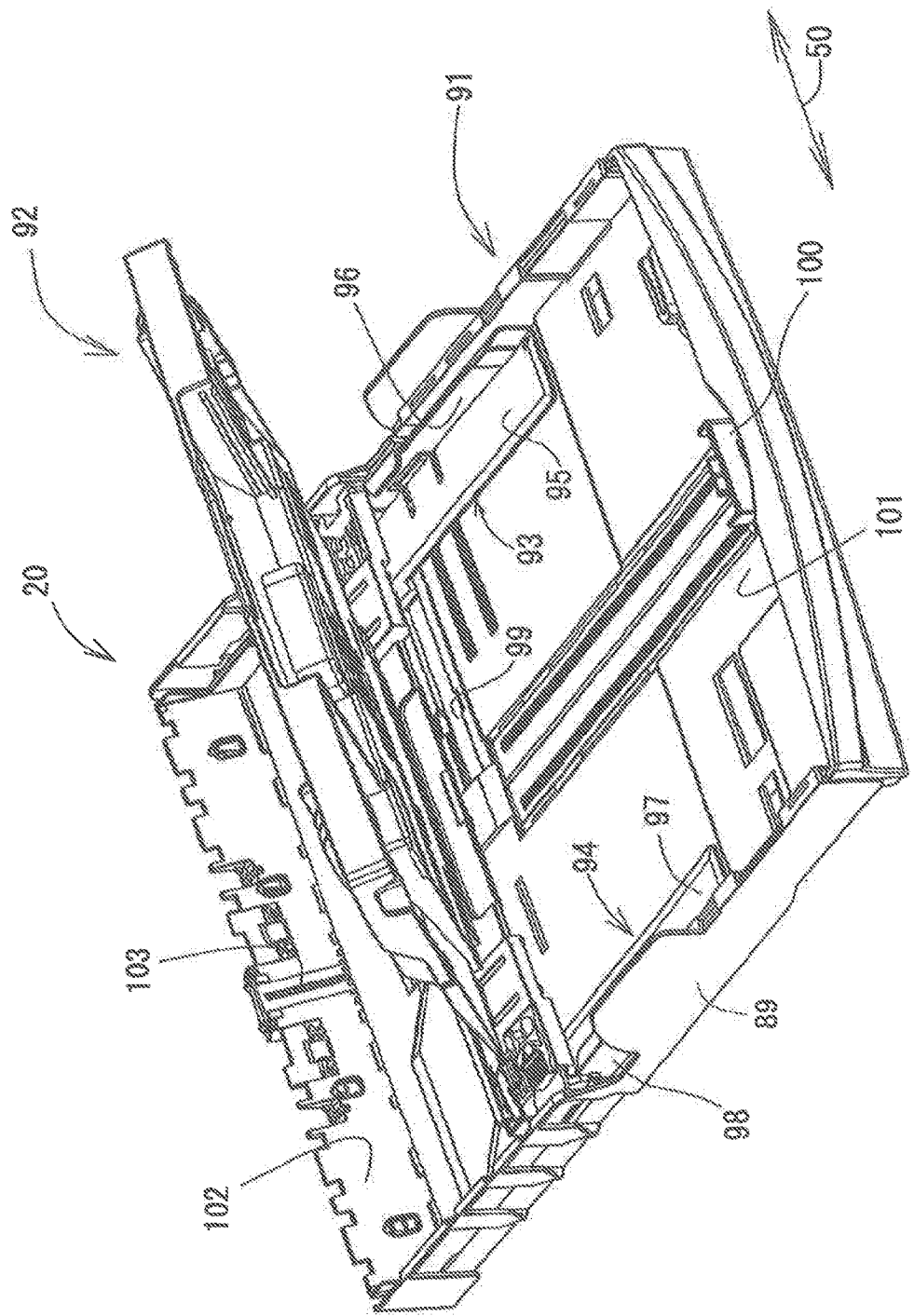
FIG. 7 is a perspective view showing an opening posture of a second tray of the sheet-supply tray device.
Figure 8:
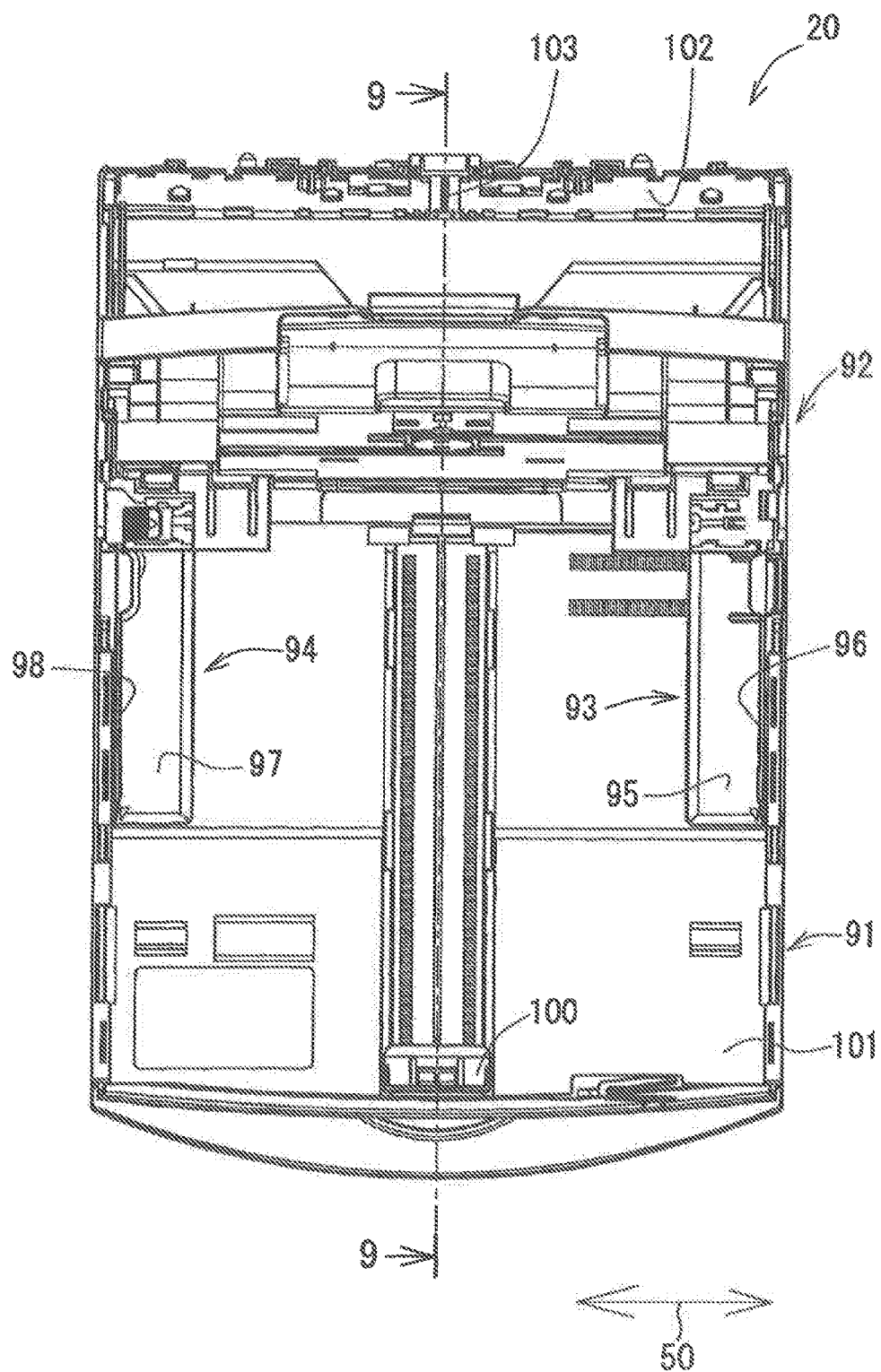
FIG. 8 is a plan view showing the opening posture of the second tray of the sheet-supply tray device.

FIG. 7 shows the sheet-supply tray device 20 in a state in which the second tray 92 takes the stacked posture; and FIG. 8 shows the sheet-supply tray device 20 in a state in which the second tray 92 takes the opening posture.

The first tray 91 is formed of a synthetic resin. As shown in FIG. 7, the first tray 91 includes a pair of side-end guides 93, 94 that are slideable in a widthwise direction thereof, i.e., a direction indicated by Arrow 50 in FIGS. 7 and 8 or a direction perpendicular to the drawing sheet of FIG. 9. The first side-end guide 93 includes a support plate 95, and a side plate 96 that extends vertically upward from the support plate 95. Similarly, the second side-end guide 94 includes a support plate 97, and a side plate 98 that extends vertically upward from the support plate 97. The ordinary paper sheets are placed on, and held by, the two side-end guides 93, 94.

A linear guide bar 99 extends from the first support plate 95 toward the second support plate 97; and another linear guide bar (not shown) extends from the second support plate 97 toward the first support plate 95. Thus, the two linear guide bars 99 are spaced from, and opposed to, each other in a lengthwise direction of the first tray 91, and extend parallel to each other in the widthwise direction of the same 91. Respective opposed surfaces of the two linear guide bars 99 that are opposed to each other have respective racks, and a pinion gear is provided between the two racks such that the pinion gear is meshed with each of the two racks. Thus, the two linear guide bars 99 are connected to each other via the rack-and-pinion device. Moreover, the two linear guide bars 99 fit in respective grooves (not shown) formed in a bottom wall 101 (i.e., a sheet-support wall) of the first tray 91. The two grooves extend in the widthwise direction of the first tray 91, and each of the two linear guide bars 99 is slideable in a corresponding one of the two grooves. In the present embodiment, the above-described sheet-supply direction is defined as being parallel to the bottom wall 101 (i.e., the sheet-support wall) of the first tray 91.

Owing to the rack-and-pinion device, the two linear guide bars 99 are moved or displaced symmetrically with respect to a longitudinal centerline of the first tray 91 that is parallel to the sheet-supply direction. Therefore, if recording sheets are placed on the two side-end guides 93, 94 and the two side-end guides 93, 94 are slid in the widthwise direction of the first tray 91, then the two side plates 96, 98 engage opposite side edges of each of the recording sheets, respectively. Thus, the recording sheets are positioned relative to the first tray 91, such that respective longitudinal centerlines of the recording sheets are aligned with the longitudinal centerline of the first tray 91. That is, irrespective of the size of the recording sheets, the recording sheets accommodated by the first tray 91 are positioned relative to the same 91, such that the respective longitudinal centerlines of the recording sheets are aligned with the longitudinal centerline of the first tray 91. In addition, the two side plates 96, 98 cooperate with each other to direct the recording sheets such that the widthwise opposite side edges of each of the recording sheets extend parallel to the lengthwise direction of the first tray 91, i.e., the sheet-supply direction in which each recording sheet is supplied from the same 91. Thus, when each recording sheet is supplied from the first tray 91, the each recording sheet can be prevented from being obliquely moved relative to the sheet-supply direction and accordingly occurrence of jamming of the each sheet can be effectively prevented.

The first tray 91 additionally includes a trailing-end positioning plate 100 that extends upward from the bottom wall 101 of the tray 91 and is slideable in the lengthwise direction of the same 91. The trailing-end positioning plate 100 can be slid to engage respective trailing ends of the recording sheets stacked on the bottom wall 101, and thereby position the recording sheets in the lengthwise direction of the first tray 91. Owing to the two side-end guides 93, 94 and the trailing-end positioning plate 100, the recording sheets are positioned with respect to the widthwise and lengthwise directions of the first tray 91, so that when each recording sheet is supplied from the first tray 91, the each recording sheet can be effectively prevented from being obliquely moved relative to the sheet-supply direction.

Moreover, the first tray 91 includes the inclined sheet-separate plate 102 provided in a lengthwise rear end portion thereof, i.e., in a downstream-side end portion thereof in the sheet-supply direction. The inclined sheet-separate plate 102 is formed integrally with the first tray 91. A sheet-separate member 103 formed of a metal is provided in a middle portion of the inclined sheet-separate plate 102. Each recording sheet to be supplied from the sheet-supply tray device 20 first engages the sheet-separate member 103. Thus, even if a plurality of recording sheets may be simultaneously moved by a sheet-supply roller 25, only the uppermost one of those recording sheets is separated from the other recording sheet(s) and is supplied to the sheet-convey path 23.

Figure 3:
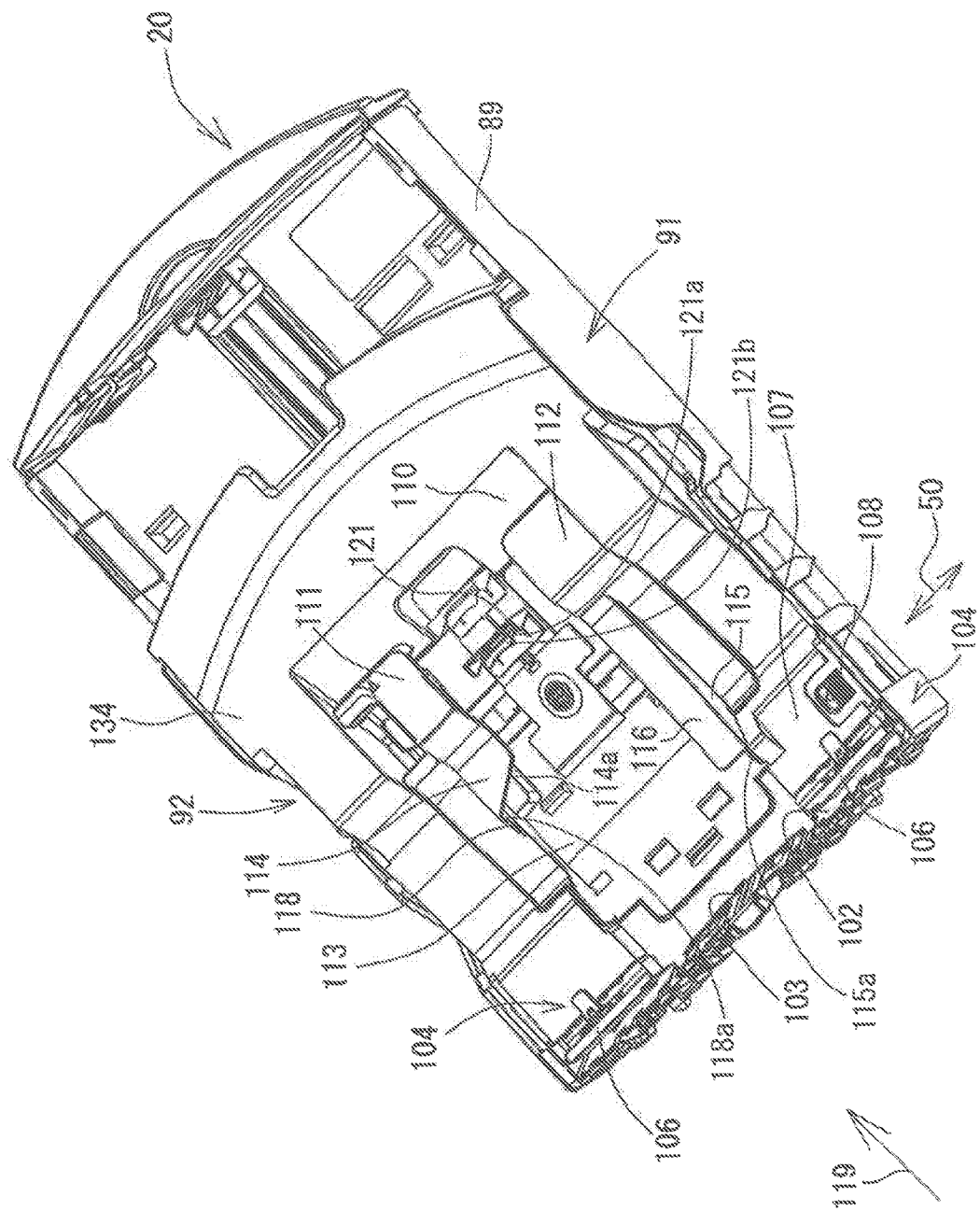
FIG. 3 is a perspective view of a sheet-supply tray device of the MFD.
Figure 4:
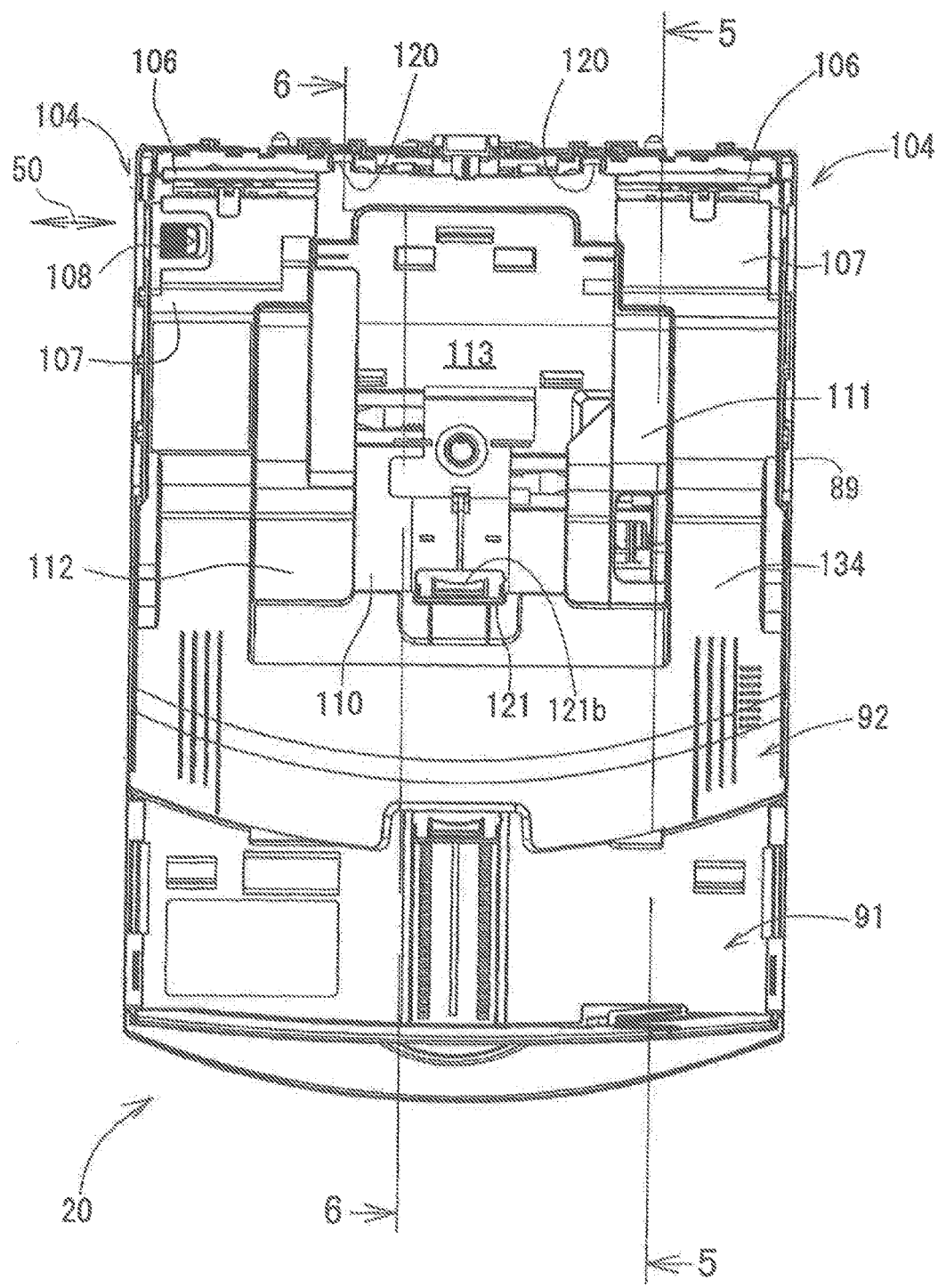
FIG. 4 is a plan view of the sheet-supply tray device.

As shown in FIGS. 3 and 4, the second tray 92 is supported by a peripheral wall 89 of the first tray 91, such that the second tray 92 is slideable relative to the first tray 91 in the lengthwise direction thereof. In a state in which the second tray 92 is in an advanced position thereof relative to the first tray 91, as shown in FIGS. 3 and 4, the second sort of recording sheets (i.e., the special paper sheets) accommodated by the second tray 92 can be supplied, one by one, to the image recording unit 24. Meanwhile, in a state in which the second tray 92 is in a retracted position thereof relative to the first tray 91, as shown in FIGS. 7 and 8, the first sort of recording sheets (i.e., the ordinary paper sheets) accommodated by the first tray 92 can be supplied, one by one, to the image recording unit 24.

As shown in FIG. 4, the second tray 92 includes a locking member 108 that is provided in a left-hand-side portion of the tray 92 and is slideable in a widthwise direction thereof. If the locking member 108 is slid leftward, i.e., outward at a prescribed position relative to the first tray 91, then the locking member 108 is engaged with the first tray 91, so that the second tray 92 is positioned relative to the first tray 91. However, the locking member 108 may be elastically biased to project outward from the second tray 92. In the latter case, when the second tray 92 is slid relative to the first tray 91 in the lengthwise direction thereof and is stopped at the prescribed position relative to the first tray 91, the locking member 108 automatically projects, owing to the elastic biasing force, outward from the second tray 92 so as to be engaged with the first tray 91. Thus, the second tray 92 is automatically positioned relative to the first tray 91.

Figure 5:
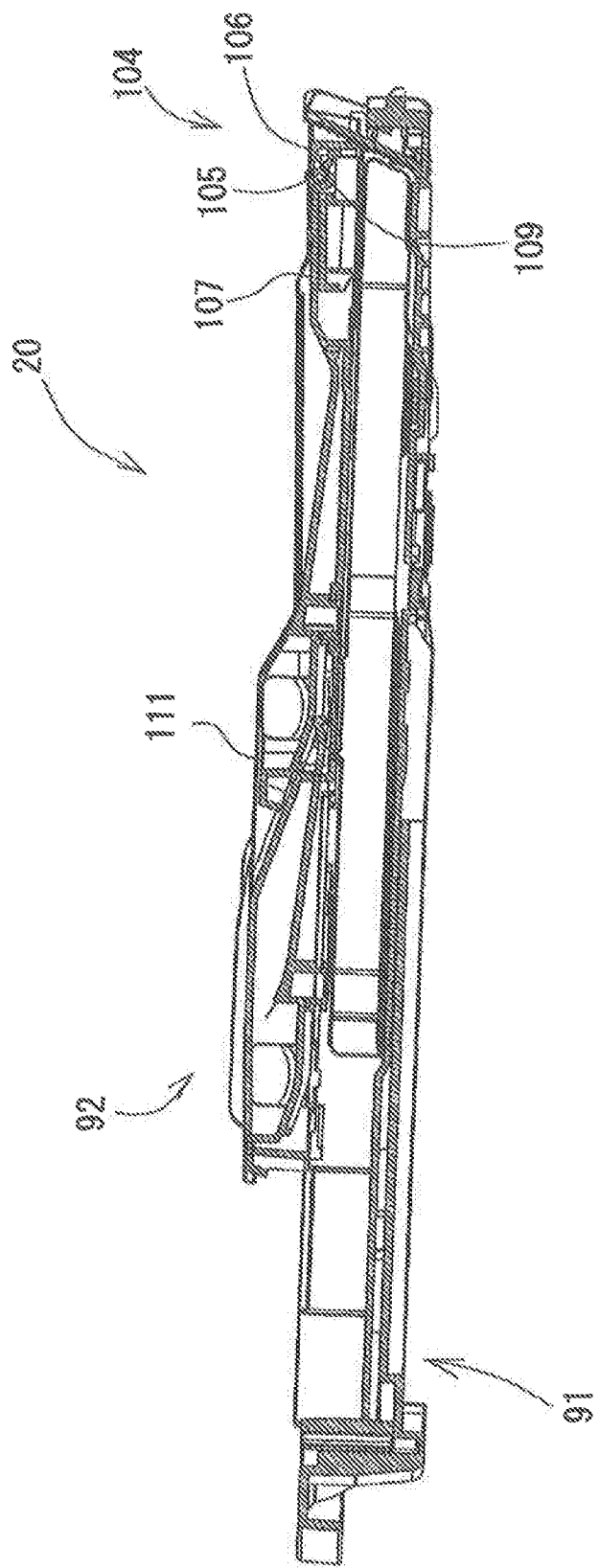
FIG. 5 is a cross-sectional view taken along 5, 5 in FIG. 4.

As shown in FIG. 5, the second tray 92 includes two portions, i.e., a base portion 106 and a pivotable portion 107 (i.e., a displaceable portion). In the state in which the locking member 108 is engaged with the first tray 91, the base portion 106 is temporarily fixed to the first tray 91. On the other hand, in the state in which the locking member 108 is disengaged from the first tray 91, the base portion 106 can be slid relative to the first tray 91. The pivotable portion 107 is connected to the base portion 106 via a supporting device 104 that includes a pair of pivotal support shafts 105. That is, the pivotable portion 107 is hinged with the base portion 106, such that the pivotable portion 107 is pivotable about a common axis line of the pivotal support shafts 105 relative to the base portion 106 and the first tray 91.

In the present embodiment, the two pivotal support shafts 105 are fixed to the base portion 106. The pivotable portion 107 includes a pair of bearing portions 109 that bear the two pivotal support shafts 105, respectively. However, the two pivotal support shafts 105 may be fixed to the pivotable portion 107, and the base portion 106 may include the two bearing portions 109. Therefore, the pivotable portion 107 is pivotable between a laid posture thereof, shown in FIG. 5, in which the pivotable portion 107 is laid on the first tray 91, and a raised posture thereof, shown in FIG. 9, in which the pivotable portion 107 is raised from the first tray 91. The laid posture of the pivotable portion 107 corresponds to the above-described stacked posture of the second tray 92; and the raised posture of the pivotable portion 107 corresponds to the above-described opening posture of the second tray 92. In the present embodiment, the raised posture of the pivotable portion 107 is established by pivoting the pivotable portion 107 by 110 degrees from its laid posture. The angle of pivotal motion of the pivotable portion 107 has no limitations. However, preferably, the angle is not smaller than 90 degrees and, more preferably, the angle is not smaller than 90 degrees and not greater than 120 degrees. Any known stopper means may be employed to limit the pivotal motion of the pivotable portion 107 relative to the base portion 106 in a direction from its laid posture to its raised posture. For example, the pivotable portion 107 is provided with one or more projections. In the latter case, when the pivotable portion 107 is pivoted by a prescribed angle, those projections will butt on the base portion 106 so as to prevent a further pivotal motion of the pivotable portion 107. A position where the common axis line of the two pivotal support shafts 105 is located is determined in a manner describe later.

The special paper sheets are accommodated and held by the pivotable portion 107. To this end, the pivotable portion 107 includes a recessed portion 110 into which the special sheets can be inserted. The recessed portion 110 is formed by recessing a central portion of the pivotable portion 107 in a downward direction toward the first tray 91. The special sheets are placed on a bottom surface 113 (i.e., a sheet-support surface) of the recessed portion 110 of the pivotable portion 107. In the present embodiment, the sheet-supply direction is defined as being parallel to the bottom surface 113 (i.e., the sheet-support surface) of the pivotable portion 107. A pair of sheet covers 111, 112 as a pair of sheet-dropping preventing covers cooperate with each other to partly cover the bottom surface 113. The two sheet covers 111, 112 respectively contact opposite side edges of each of the special sheets accommodated by the recessed portion 110, and thereby cooperatively position the each special sheet in the widthwise direction of the second tray 92 and hold the each sheet.

The first sheet cover 111 has an L-shaped cross section. More specifically described, the first sheet cover 111 includes a plate-like leg portion 118 extending vertically upward from the bottom surface 113 and having an inner surface 118a as a first side-end contact surface, and additionally includes a plate-like top portion 114 as a first side-end protrusion extending horizontally from an upper end of the inner surface 118a of the leg portion 118 toward the second sheet cover 112. Thus, the top portion 114 extends parallel to the bottom surface 113, and is opposed to the same 113. A dimension of a space left between the bottom surface 113 and the top portion 114 has no limitations. In the present embodiment, the distance is so selected that the recessed portion 110 can accommodate a prescribed number of special paper sheets, for example, the distance may be selected at from 5 mm to 15 mm.

The second sheet cover 112 also has an L-shaped cross section, and includes a plate-like leg portion 115 and a plate-like top portion 116. The leg portion 115 extends vertically upward from the bottom surface 113 and has an inner surface 115a as a second side-end contact surface, and the top portion 116 as a second side-end protrusion extends horizontally from an upper end of the inner surface 115a of the leg portion 115 toward the first sheet cover 111. Thus, the top portion 116 also extends parallel to the bottom surface 113, and is opposed to the same 113. A dimension of a space left between the bottom surface 113 and the top portion 116 is equal to the dimension of the space left between the bottom surface 113 and the top portion 114.

Since the second tray 92 has the two sheet covers 111, 112, the special paper sheets accommodated by the tray 92 can be reliably held by the same 92. Therefore, even if the second tray 92 may change its posture in the state in which the special sheets are accommodated by the tray 92, the special sheets can be prevented from dropping out of the tray 92, i.e., falling from the same 92. In addition, the two sheet covers 111, 112 cooperate with each other to guide the special sheets being inserted into the space present between the bottom surface 113 and the covers 111, 112 in a direction indicated by Arrow 119 (FIG. 3). When the second tray 92 is replenished with new special paper sheets, first, the sheet-supply tray device 20 is removed from the housing of the MFD 1, and then the special sheets are inserted into the second tray 92 in the direction indicated by Arrow 119.

The respective planar top portions 114, 116 of the two sheet covers 111, 112 extend in the lengthwise direction of the second tray 92, i.e., the sheet-supply direction. The second top portion 116 extends to a position near the supporting device 104, whereas the first top portion 114 extends to only a position corresponding to an intermediate portion of the second top portion 116, i.e., does not have a downstream-side end portion in the sheet-supply direction and has an inclined end surface 114a. Since the downstream-side end portion of the first top portion 114 is cut away, special paper sheets can be easily inserted into the space left between the bottom surface 113 and the respective top portions 114, 116 of the two sheet covers 111, 112, in the direction indicated by Arrow 119.

Figure 6:
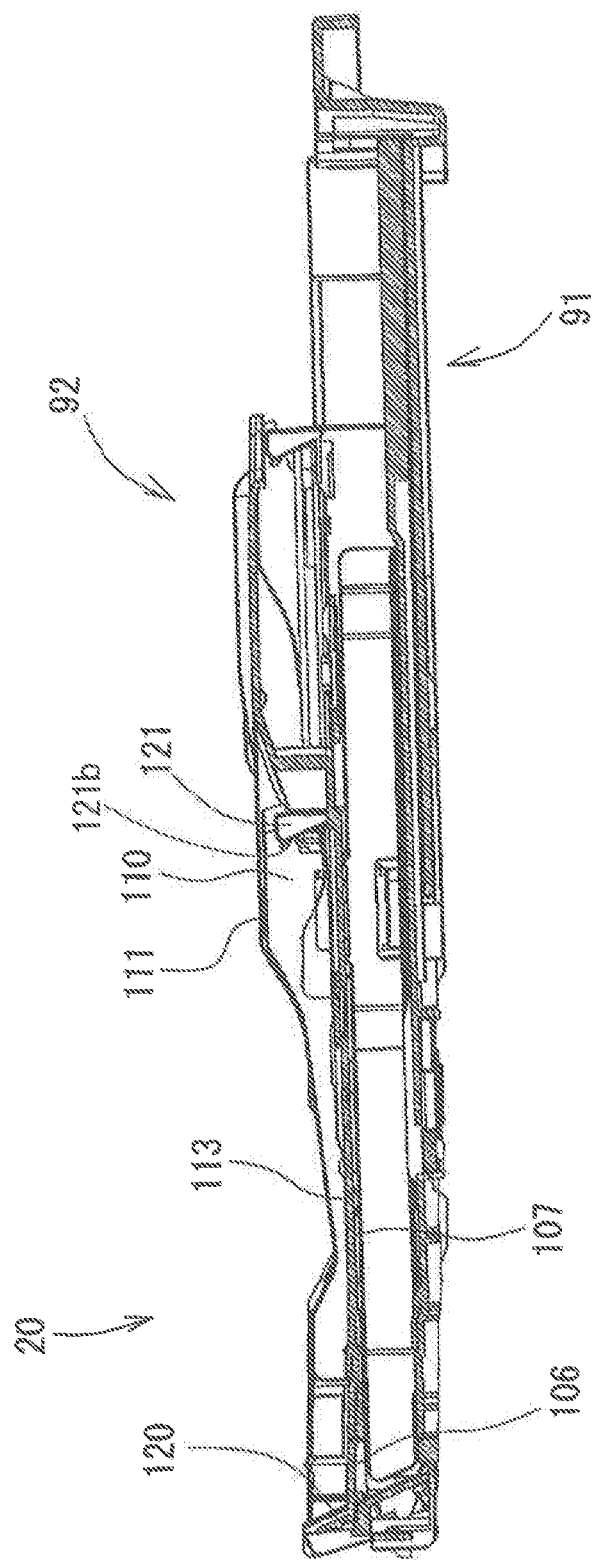
FIG. 6 is a cross-sectional view taken along 6, 6 in FIG. 4.
Figure 9:
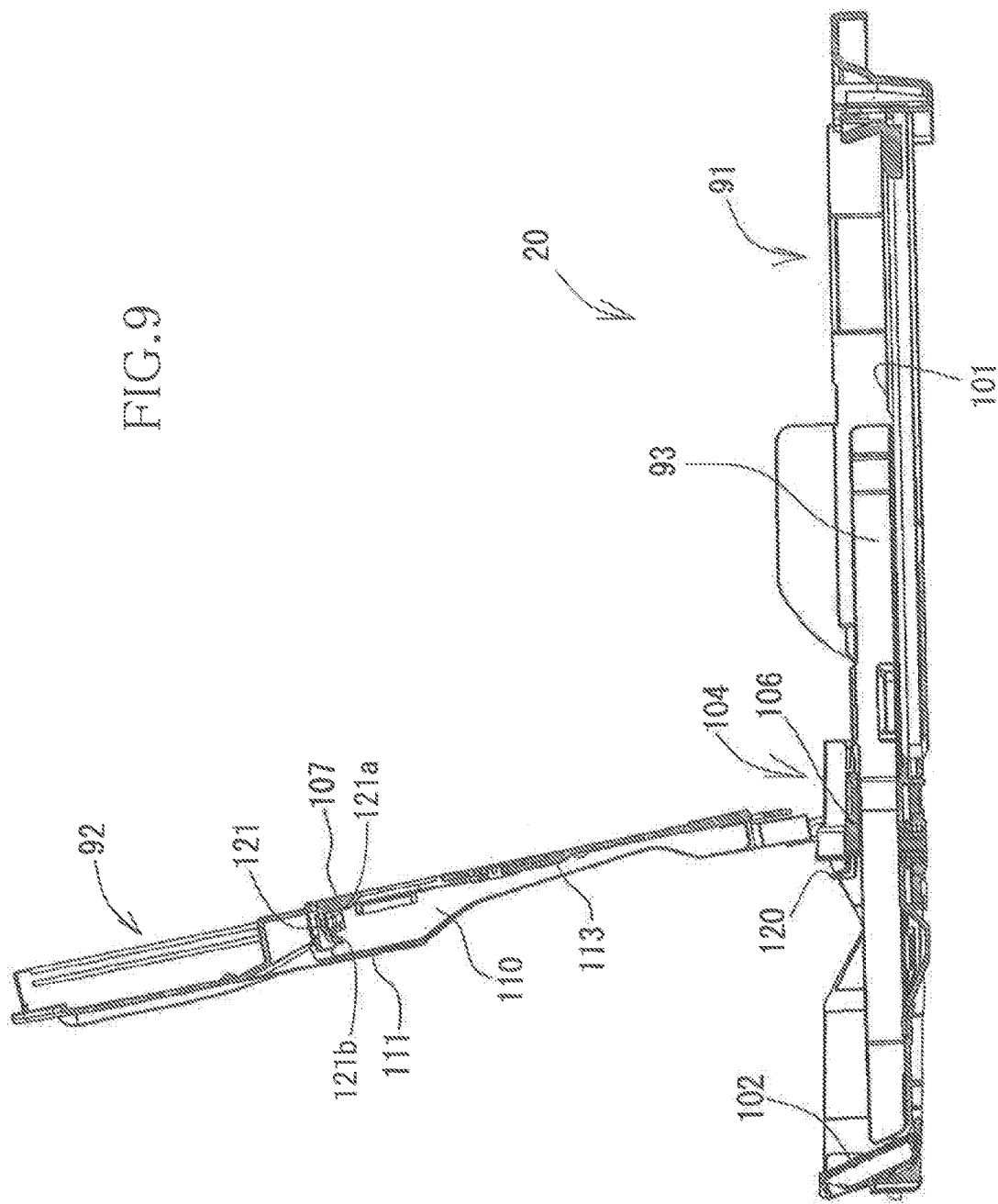
FIG. 9 is a cross-sectional view taken along 9, 9 in FIG. 8.

As shown in FIGS. 4, 6, and 9, the base portion 106 includes a leading-end contact member 120 (or a leading-end contact wall) that projects from a downstream-side end of the base portion 106 such that the leading-end contact member 120 extends substantially parallel to the inclined sheet-separate plate 102 of the first tray 91. A leading end of each of the special paper sheets accommodated by the recessed portion 110 contacts an inner surface of the leading-end contact member 120, so that the leading end of each special sheet is positioned relative to the second tray 92. In addition, as shown in FIGS. 3 and 4, the pivotable portion 107 includes a trailing-end contact member 121 (or a trailing-end contact wall) that extends upward from the bottom surface 113 and whose inner surface 121a contacts a trailing end of each of the special sheets and has a trailing-end protrusion 121b extending toward the leading-end contact member 120. Thus, the trailing end of each special sheet is positioned relative to the second tray 92. As shown in FIG. 3, the trailing-end contact member 121 is slideable, in the lengthwise direction of the second tray 92, between a first position indicated by solid lines and a second position indicated by broken lines. Therefore, even if the current sort of special sheets may be replaced with a different sort of special sheets having a different dimension in the lengthwise direction of the second tray 92, the trailing end of each of the different sort of special sheets can be reliably positioned by the trailing-end contact member 121.

Figure 10:
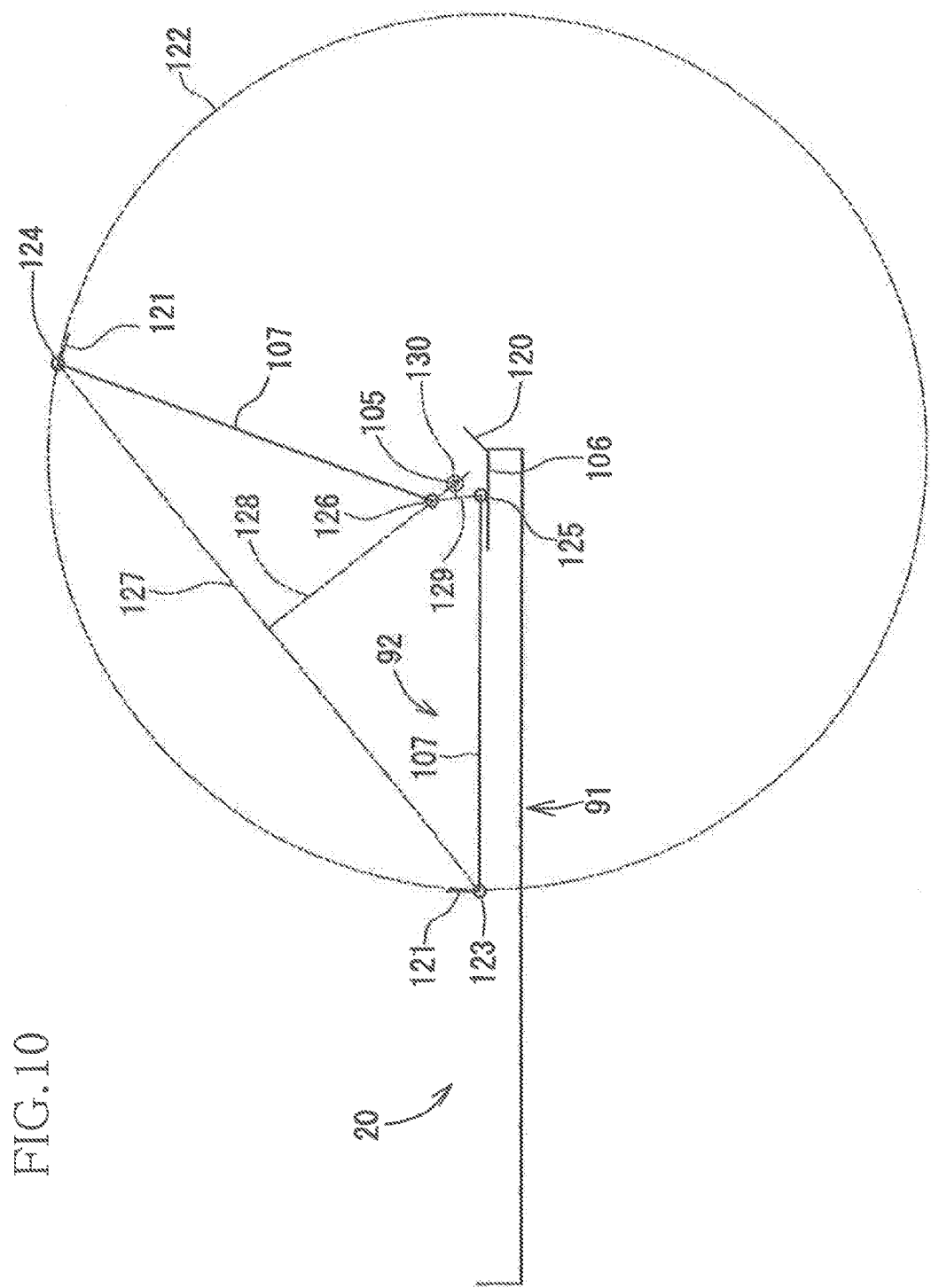
FIG. 10 is a schematic view showing a construction of the sheet-supply tray device.

FIG. 10 is a view for illustratively showing the construction of the sheet-supply tray device 20 and explaining a manner in which the position of the common axis line of the pivotal support shafts 105 is determined.

As shown in the figure, the second tray 92 is provided on the first tray 91 and, if the pivotable portion 107 thereof is pivoted to its raised posture, then the second tray 92 is changed to its opening posture. The pivotable portion 107 is pivotable between its laid and raised postures about the common axis line of the pivotal support shafts 105. The two pivotal support shafts 105 are provided in the vicinity of the boundary between the base portion 106 and the pivotable portion 107, and the common axis line of the two pivotal support shafts 105 extend in the widthwise direction of the sheet-supply tray device 20, i.e., the direction perpendicular to the sheet-supply direction. The common axis line of the two pivotal support shafts 105 is located at such a position assuring that even if the pivotable portion 107 may be pivoted relative to the base portion 106 and accordingly the second tray 92 may change its posture, the special paper sheets accommodated by the second tray remain safely held thereby without being plastically or irreversibly deformed (e.g., folded back).

However, the above-indicated position cannot be univocally determined. More specifically described, that position can be determined based on respective positions of a downstream-side end, and the trailing-end contact member 121, of the pivotable portion 107 when the pivotable portion 107 is in its laid posture, respective positions of the downstream-side end and the trailing-end contact member 121 when the pivotable portion 107 is in its raised posture, and/or the angle of pivotal motion of the pivotable portion 107 between its laid and raised postures. However, those positions and that angle are not given as a single set of solutions, i.e., there are a plurality of sets of solutions for the positions and the angle. Therefore, there are a plurality of solutions for the above-described position that assures that when the second tray 92 changes its posture, the special paper sheets are not plastically deformed.

In the present embodiment, the angle of pivotal motion of the pivotable portion 107 between its laid and raised postures is selected at 110 degrees. Thus, the position of the common axis line of the two pivotal support shafts 105 is determined in the following manner:

The special paper sheets accommodated by the second tray 92 are positioned relative to the same 92 by being sandwiched by the leading-end contact member 120 and the trailing-end contact member 121. Therefore, when the pivotable portion 107 is pivoted and accordingly the second tray 107 changes its posture, the leading ends of the special sheets remain positioned by the leading-end contact member 120. However, the trailing ends of the special sheets are moved with the pivotable portion 107. In other words, the pivotable portion 107 is pivoted about the common axis line of the two pivotal support shafts 105, whereas the trailing ends of the special sheets are pivoted about the leading ends thereof positioned by the leading-end contact member 120. Therefore, a locus of the pivotal motion of the special sheets coincides with a virtual circle 122 whose radius is equal to a dimension of the specials sheets in the sheet-supply direction, i.e., in the lengthwise direction of the second tray 92.

In the present embodiment, the angle of pivotal motion of the pivotable portion 107 between its laid posture and its raised posture is selected at 110 degrees, and the trailing-end contact member 121 of the pivotable portion 107 being in its raised posture is located on the virtual circle 122, as shown in FIG. 10. However, under the condition that the trailing-end contact member 121 is located on the virtual circle 122, the position of the pivotable portion 107 being in its raised posture cannot be univocally determined. That is, the pivotable portion 107 may be located at any position so long as the trailing-end contact member 121 is located on the virtual circle 122. Meanwhile, the position of the pivotable portion 107 being in its raised posture should be appropriately determined such that when the second tray 92 is in its opening posture, i.e., when the pivotable portion 107 is in its raised posture, the first tray 91 is largely opened.

If the position of the pivotable portion 107 being in its raised posture has been determined, then it can be known that the trailing-end contact member 121 of the pivotable portion 107 is moved from a first position 123 corresponding to the laid posture, to a second position 124 corresponding to the raised posture, and the downstream-side end of the pivotable portion 107 is moved from a third position 125 corresponding to the laid posture, to a fourth position 126 corresponding to the raised posture. Then, a normal bisector 128 of a virtual straight line 127 connecting between the first and second positions 123, 124, and a normal bisector 130 of a virtual straight line 129 connecting between the third and fourth positions 125, 126 can be obtained, and a position of an intersection of the two normal bisectors 128, 30 can be determined as the position of the common axis line of the two pivotal support shafts 105. If the common axis line of the support shafts 105 is located at the thus determined position, then the trailing-end contact member 121 of the pivotable portion 107 is moved from the first position 123 to the second position 124 on a first arc whose center rides on the common axis line, and the downstream-side end of the pivotable portion 107 is moved from the third position 125 to the fourth position 126 on a second arc whose center rides on the common axis line.

Figure 11:
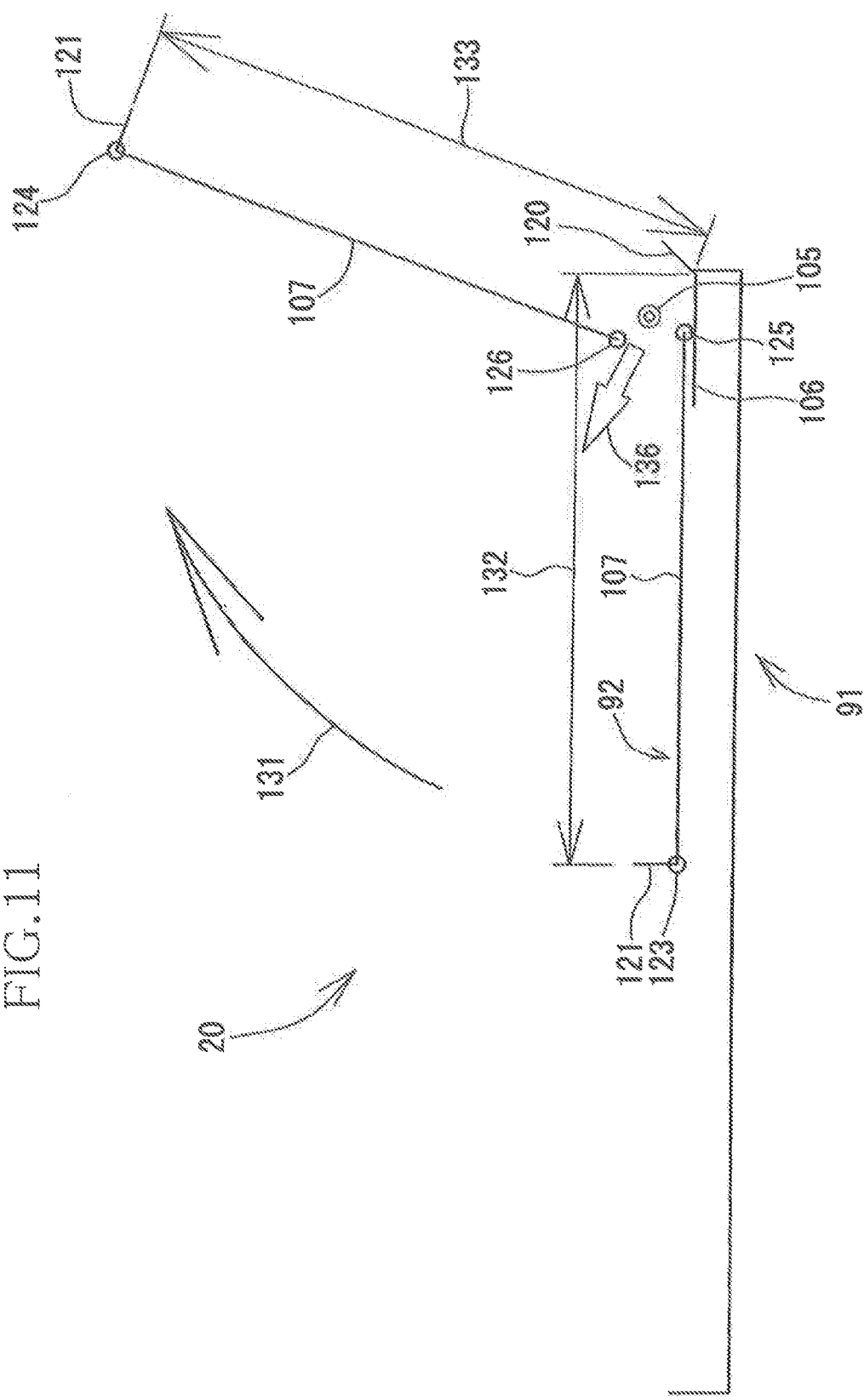
FIG. 11 is a schematic view showing the changing of posture of the second tray of the sheet-supply tray device.
Figure 12:
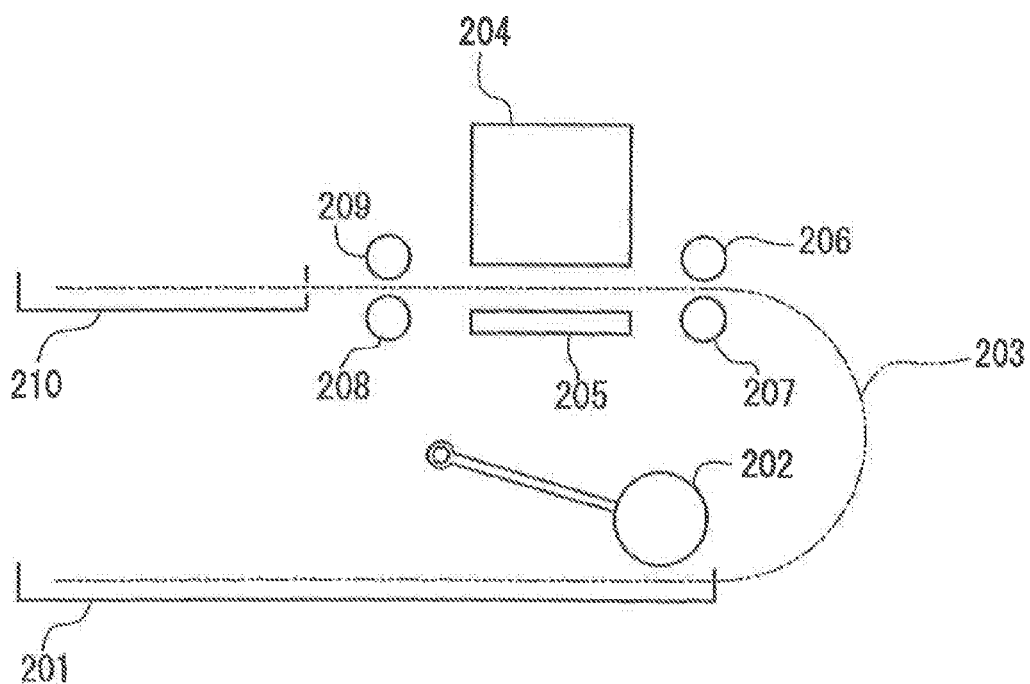
FIG. 12 is a schematic view showing an internal construction of a conventional ink-jet recording apparatus.

FIG. 11 is a view for illustratively showing the manner in which the second tray 92 changes its posture when the pivotable portion 107 is pivoted about the pivotal support shafts 105 in a direction indicated by Arrow 131.

As shown in the figure, if the position of the common axis line of the two pivotal support shafts 105 is determined in the above-described manner, then a distance 132 between the leading-end contact member 120 and the trailing-end contact member 121 when the second tray 92 is in its stacked posture is equal to a distance 133 between the two contact members 120, 121 when the second tray 92 is in its opening posture, and is also equal to the dimension of each special paper sheet in the lengthwise direction of the second tray 92, i.e., the sheet-supply direction.

However, the leading-end contact member 120 of the base portion 106 is inclined relative to the sheet-support surface 113 of the pivotable portion 107. In addition, as described above, the maximum number of special paper sheets that can be stacked on each other in the second tray 92 is prescribed. Therefore, the common axis line of the two pivotal support shafts 105 is located at the position assuring that when the second tray 92 is selectively changed to its stacked posture and its opening posture, a first distance between a first portion of the leading-end contact member 120 (i.e., the first positioning wall) of the base portion 106 that contacts and positions the leading end of the lowermost one of the maximum number of stacked special sheets, and a second portion of the trailing-end contact member 121 (i.e., the second positioning wall) of the pivotable portion 107 that contacts and positions the trailing end of the lowermost special sheet continues to be not smaller than a dimension of the lowermost special sheet in the sheet-supply direction, and a second distance between a third portion of the leading-end contact member 120 that contacts and positions the leading end of the uppermost one of the maximum number of stacked special sheets, and a fourth portion of the trailing-end contact member 121 that contacts and positions the trailing end of the uppermost special sheet continues to be not smaller than a dimension of the uppermost special sheet in the sheet-supply direction. The leading-end contact member 120 of the base portion 106 is inclined relative to the sheet-support surface 113 of the pivotable portion 107 such that the above-indicated second distance is greater than the above-indicated first distance, as shown in FIG. 11.

In addition, the trailing-end contact member 121 of the pivotable portion 107 is moved on the first arc that is located outside the virtual circle 122, because the center of the virtual circle 122 is located on the leading-end contact member 120 of the base portion 106, the radius of the same 122 is equal to the distance 132, and the downstream-side end of the pivotable portion 107 is moved on the second arc which is located the left-hand side of the pivotal support shafts 105 (FIG. 10), whose center is located on the pivotal support shafts 105, and whose radius is equal to a distance between the downstream-side end and the pivotal support shafts 105. Thus, in the present embodiment, when the pivotable portion 107 is pivoted and the second tray 92 changes its posture, the distance between the leading-end contact member 120 and the trailing-end contact member 121 does not become smaller than the dimension of each special paper sheet in the sheet-supply direction, i.e., continues to be equal to, or greater than, the dimension. This dimension is equal to a distance between the leading-end contact member 120 and the trailing-end contact member 121 in the sheet-supply direction in the state in which the second tray 92 takes its stacked posture.

In the present embodiment, the position of the common axis line of the two pivotal support shafts 105 is determined in the above-described manner. However, the position may be determined under a different condition. For example, although, in the present embodiment, the position is determined under the condition that the angle of pivotal motion of the pivotable portion 107 between its laid posture and its raised posture is prescribed at 110 degrees, the position may be determined based on not the prescribed angle but respective prescribed positions of the trailing-end contact member 121 and the downstream-side end of the pivotable portion 107 being in its laid posture and respective prescribed positions of the trailing-end contact member 121 and the downstream-side end of the pivotable portion 107 being in its raised posture. In this case, too, a normal bisector of a virtual straight line connecting between the respective positions of the trailing-end contact member 121 of the pivotable portion 107 in the laid and raised postures, and a normal bisector of a virtual straight line connecting between the respective positions of the downstream-side end of the pivotable portion 107 in the laid and raised postures are obtained, and a position of an intersection of the two normal bisectors is determined as the position of the common axis line of the pivotal support shafts 105.

The position of the common axis line of the two pivotal support shafts 105 can be arbitrarily determined by adjusting the position of the downstream-side end of the pivotable portion 107. For example, in the case where the position of the common axis line of the pivotal support shafts 105 is adjusted or moved in a direction indicated by a white arrow 136, shown in FIG. 11, the trailing-end contact member 121 of the pivotable portion 107 is moved on a locus located outside the virtual circle 122, i.e., distant leftward from the same 122 in FIG. 10. Therefore, when the pivotable portion 107 is pivoted, the distance between the leading-end contact member 120 and the trailing-end contact member 121 in the sheet-supply direction becomes larger than the dimension of each special paper sheet in the same direction. Preferably, the common axis line of the pivotal support shafts 105 is located on an opposite side of the bottom wall (i.e., the sheet-support wall) of the pivotable portion 107 that is opposite to the first tray 91, on the left-hand side of the leading-end contact member 120 (FIG. 10), and on the right-hand side of the trailing-end contact member 121 (FIG. 10).

As shown in FIGS. 3 and 4, the sheet-discharge tray 21 is constituted by the second tray 92 of the sheet-supply tray device 20. As shown in FIG. 2, when an ordinary paper sheet is supplied from the first tray 91 of the sheet-supply tray device 20 and an image is recorded on the ordinary sheet, respective upper surfaces of the two sheet covers 111, 112 and an upper surface 134 of the second tray 92 cooperate with each other to function as the sheet-discharge tray 21; and when a special paper sheet is supplied from the second tray 92 of the sheet-supply tray device 20 and an image is recorded on the special sheet, the respective upper surfaces of the two sheet covers 111, 112 function as the sheet-discharge tray 21.

As shown in FIG. 2, the sheet-supply roller 25 as a sheet mover is provided above the sheet-supply tray device 20, and is pressed against the recording sheets stacked in the tray device 20. The sheet-supply roller 25 cooperates with the inclined sheet-separate plate 102 to separate each of the recording sheets stacked in the sheet-supply tray device 20, from the other recording sheets, and supplies the thus separated recording sheet to the sheet-convey path 23. The sheet-supply roller 25 is rotatably supported by a lower end portion of a sheet-supply arm 26. In addition, the sheet-supply arm 26 supports a power transmission device 27 that includes a plurality of gears meshed with each other and that is connected, at one end thereof, to the sheet-supply roller 25. When an electric motor (not shown) that is connected to the other end of the power transmission device 27 is driven or rotated, a driving power of the motor is transmitted to the sheet-supply roller 25 via the transmission device 27, so that the roller 25 is rotated to move each recording sheet toward the inclined sheet-separate plate 102. The sheet-supply roller 25, the sheet-supply arm 26, the power transmission device 27, and the electric motor (not shown) cooperate with each other to constitute a portion of a moving device that moves each recording sheet.

An upper or base end portion of the sheet-supply arm 26 is supported by an axis member 26a, such that the arm 26 is pivotable downward and upward about the axis member 26a so as to be moved toward, and away from, the sheet-supply tray device 20. As shown in FIG. 2, a self-weight of the sheet-supply arm 26 biases the arm 26 downward toward the sheet-supply tray device 20. In the figure, the second tray 92 takes a retracted position thereof (i.e., a left-hand position thereof) relative to the first tray 91, as a result of sliding of the second tray 92 in a direction opposite to the sheet-supply direction. Thus, the sheet-supply roller 25 is contacted with the ordinary sheets accommodated by the first tray 91. On the other hand, if the sheet-supply tray device 20 is removed from the MFD1, subsequently the second tray 92 is slid downstream with respect to the sheet-supply direction, so as to take an advanced position thereof relative to the first tray 91, and then the sheet-supply tray device 20 is inserted again into the MFD 1, then the second tray 92 engages and moves the sheet-supply arm 26 upward, i.e., pivots the arm 26 counterclockwise, so that the sheet-supply roller 25 is contacted with the special paper sheets accommodated by the second tray 92. Thus, the user can easily change the first sort of recording sheets that are currently used for recording of images, to the second sort of recording sheets that are to be next used for recording of images, by means of just sliding the second tray 92 relative to the first tray 91, i.e., without exchanging the two sorts of recording sheets with each other in the first or second tray 91, 92.

When the sheet-supply tray device 20 also functioning as the sheet-discharge tray 21 is inserted into, or removed from, the MFD 1 via the front opening 4 (FIG. 2), the sheet-supply arm 26 is forcedly retracted to an upper position thereof. In the state in which the sheet-supply arm 26 is pivoted downward, the sheet-supply roller 25 supported by the lower end portion of the arm 26 is pressed on the uppermost one of the recording sheets stacked in the sheet-supply tray device 20. If, in this state, the sheet-supply roller 25 is rotated, a frictional force is produced between an outer circumferential surface of the roller 25 and an upper surface of the uppermost recording sheet and, owing to this frictional force, the uppermost sheet is moved toward the inclined sheet-separate plate 102. When the leading end of the uppermost recording sheet engages the inclined sheet-separate plate 102, the recording sheet is guided upward toward the sheet-convey path 23. When the uppermost recording sheet is moved toward the inclined sheet-separate plate 102, the underlying recording sheet or sheets may be moved with the uppermost sheet, because of the friction or static electricity produced therebetween. However, no further movement of the underlying recording sheet or sheets is allowed by the sheet-separate plate 102.

The sheet-convey path 23 is defined, except for a portion thereof corresponding to the image recording unit 24 as the image recording device, by an outside guide surface and an inside guide surface that are spaced from, and opposed to, each other. For example, a rear portion of the sheet-convey path 23 that is located in the rear portion of the MFD 1, is defined by an outside guide member 18 and an insider guide member 19 that are fixed to an inner frame of the MFD 1. The outside guide member 18 supports a plurality of sheet-convey rollers 17 such that each of the sheet-convey rollers 17 is rotatable about an axis line parallel to the widthwise direction of the sheet-convey path 23. An outer circumferential surface of each sheet-convey roller 17 is exposed in an inner guide surface of the outside guide member 18 so as to be able to engage each recording sheet. Owing to the sheet-convey rollers 17, each recording sheet can be smoothly conveyed while engaging a curved portion of the outside guide member 18 that corresponds to the U-shaped curved portion of the sheet-convey path 23.

As shown in FIG. 2, the image recording unit 24 is provided midway in the sheet-convey path 23. The image recording unit 24 includes an ink-jet recording head 39, and a carriage 38 that carries the recording head 39 and that can be reciprocated in a scanning direction along two guide members 43, 44. Four ink cartridges (not shown) are provided, in the MFD 1, at a location remote from the carriage 38 or the recording head 39. The four ink cartridges store a cyan ink (C), a magenta ink (M), a yellow ink (Y), and a black ink (Bk), respectively, and supply those inks to the recording head 39 via respective ink-supply tubes (not shown). While the carriage 38 is reciprocated, the ink-jet recording head 39 ejects droplets of the inks toward each recording sheet being positioned on a platen 42 opposed to the recording head 39, so that an image is recorded on the recording sheet. Though the present embodiment relates to the MFD 1 constructed as the ink-jet recording apparatus, the principle of the present invention is applicable to various types of image recording devices. Thus, the MFD 1 may employ any other type of image-recording technique, such as a laser-type or thermal-type image-recording technique.

As is apparent from the foregoing description of the present embodiment, since the sheet-supply tray device 20 of the MFD 1 includes the first tray 91 and the second tray 92, ordinary paper sheets of a size not smaller than A-4 Size can be accommodated by the first tray 91, and special paper sheets such as L-Size glossy sheets can be accommodated by the second tray 92. Therefore, the MFD 1 can record an image on each of the two sorts of recording sheets, while a user need not exchange the two sorts of recording sheets with each other. When the user replenishes the first tray 91 with new ordinary sheets, the second tray 92 is changed to its opening posture relative to the first tray. Thus, the first tray 91 is opened and accordingly the user can easily replenish the first tray 91 with new recording sheets.

As described above by reference to FIG. 11, even if the second tray 92 may change its posture, the distance between the leading-end contact member 120 and the trailing-end contact member 121 continues to be not smaller than the prescribed dimension or length, the special sheets accommodated by the second tray 92 can be prevented from being plastically deformed (e.g., folded back), or dropping out of the tray 92. Thus, the user can smoothly carry out the replenishing of the first tray 91 with new ordinary sheets.

In addition, as described above, the leading and trailing ends of each of the special sheets can be positioned by the leading-end contact member 120 and the trailing-end contact member 121 of the second tray 92. Therefore, even if the second tray 92 may change its posture, the special sheets remain aligned with each other with respect to the sheet-supply direction. Thus, the special sheets can be constantly or stably supplied from the sheet-supply tray device 20 in the sheet-supply direction. In particular, the second tray 92 changes its posture as a result of the pivotal motion of the pivotable portion 107 relative to the base portion 106. Since the pivotable portion 107 is pivotably supported by the pivotal support shafts 105 as the supporting device 104 that permits the second tray 92 to change its posture, the supporting device 104 can enjoy a simple arrangement.

Moreover, the pivotal support shafts 105 are located at the above-described position. Therefore, even if the second tray 92 may change its posture, the distance between the leading-end contact member 120 and the trailing-end contact member 121 continues to be not smaller than the dimension of each special sheet in the sheet-supply direction. Thus, each special sheet can be reliably prevented from being irreversibly or plastically deformed. In particular, in the present embodiment, the position of the pivotal support shafts 105 is determined such that the distance between the leading-end contact member 120 and the trailing-end contact member 121 when the second tray 92 takes the stacked posture thereof, and the distance between the leading-end contact member 120 and the trailing-end contact member 121 when the second tray 92 takes the opening posture thereof are equal to each other, and also equal to the dimension of each special sheet in the sheet-supply direction. Therefore, as shown in FIG. 11, the pivotal support shafts 105 are provided in the vicinity of respective adjacent portions of the base portion 106 and the pivotable portion 107 that are adjust to each other in the sheet-supply direction. Consequently the sheet-supply tray device 20 can enjoy a small thickness, i.e., a small dimension in the upward and downward directions. This leads to reducing the height dimension of the MFD 1 as a whole. As described above by reference to FIG. 11, since the position of the pivotal support shafts 105 is away, in the direction 136, from the center of the virtual circle 122, the trailing-end contact member 121 is moved outside the virtual circle 122, shown in FIG. 10. Thus, the special sheets can be reliably prevented from being curved or folded, i.e., damaged. In the latter case, however, since the position of the pivotal support shafts 105 is moved upward, the thickness of the sheet-supply tray device 20 is increased as such.

In addition, in the present embodiment, when the second tray 92 is changed to its opening posture, the pivotable portion 107 is pivoted about the support shafts 105 by 110 degrees. As shown in FIG. 9, if the pivotable portion 107 is pivoted by not less than 90 degrees to change the second tray 92 to its opening posture, then the second tray 92 is biased, owing to a self weight thereof, in a direction toward its opening posture to open the first tray 91. Thus, the second tray 92 is naturally held at its opening posture. Therefore, when the user replenishes the first tray 91 with new recording sheets, the user need not continue to hold, with his or her hand, the second tray 92 at its opening posture. Thus, new ordinary sheets can be easily charged into the first tray 91.

It is to be understood that the present invention may be embodied with various changes, modifications, and improvements that may occur to a person skilled in the art without departing from the spirit and scope of the invention defined in the appended claims.

What is claimed is:

1. A sheet-supply tray device for use with an image recording apparatus, the sheet-supply tray device comprising:
    a lower sheet-supply tray; and
    an upper sheet-supply tray located above the lower sheet-supply tray, the upper sheet-supply tray comprising:
        a main body which comprises a sheet support surface configured to support at least one recording sheet;
        an upper-leading-end stopper fixed on the main body and contactable with leading ends of said at least one recording sheet placed on the upper sheet-supply tray; and
        a pair of side-end stoppers each of which comprises a side-end contact surface, the side-end contact surface of said each side-end stopper having at least one side-end protrusion, wherein the upper sheet-supply tray is slideable, in a sheet-supply direction, between (a) a sheet supply position and (b) a sheet non-supply position, wherein the lower sheet-supply tray comprises a lower-leading-end stopper contactable with leading ends of at least one recording sheet placed on the lower sheet-supply tray, and wherein the lower-leading-end stopper of the lower sheet-supply tray is positioned upstream of the upper-leading-end stopper of the upper sheet-supply tray in the sheet-supply direction when the upper sheet-supply tray is positioned at the sheet-supply position, wherein, when the upper sheet-supply tray is positioned at the sheet supply position, an upper end of the lower-leading end stopper is higher than an upper end of the upper-leading end stopper and a lower end of the lower-leading end stopper is lower than a lower end of the upper-leading end stopper.

2. The sheet-supply tray device according to claim 1, wherein the respective side-end protrusions of the pair of side-end stoppers extend toward each other.

3. The sheet-supply tray device according to claim 1, wherein at least one of the pair of side-end stoppers is slideable so as to change a distance between the pair of side-end stoppers.

4. The sheet-supply tray device according to claim 1, wherein the upper sheet-supply tray comprises an upper-trailing-end stopper which comprises a trailing-end contact surface, the trailing-end contact surface having at least one trailing-end protrusion extending toward the upper-leading-end stopper.

5. The sheet-supply tray device according to claim 4, wherein the upper-trailing-end stopper is slideable relative to the upper-leading-end stopper in the sheet-supply direction so as to change a distance between the upper-leading-end stopper and the upper-trailing-end stopper in the sheet-supply direction.

6. The sheet-supply tray device according to claim 1, wherein the lower-leading-end stopper of the lower sheet-supply tray is positioned downstream of the upper-leading-end of the upper sheet-supply tray in the sheet-supply direction when the upper sheet-supply tray is positioned at the sheet non-supply position.

* * * * *